(12) United States Patent
Fernandez et al.

(10) Patent No.: US 12,056,109 B2
(45) Date of Patent: Aug. 6, 2024

(54) DATABASE SYSTEMS AND METHODS FOR CUSTOM SORTING RECORDS

(71) Applicant: Salesforce, Inc., San Francisco, CA (US)

(72) Inventors: Zara Chiara Fernandez, San Francisco, CA (US); Margaret Donaldson, New York, NY (US)

(73) Assignee: Salesforce, Inc.

( * ) Notice: Subject to any disclaimer, the term of this patent is extended or adjusted under 35 U.S.C. 154(b) by 0 days.

(21) Appl. No.: 17/818,572

(22) Filed: Aug. 9, 2022

(65) Prior Publication Data

US 2024/0054123 A1 Feb. 15, 2024

(51) Int. Cl.
*G06F 16/22* (2019.01)
*G06F 16/242* (2019.01)

(52) U.S. Cl.
CPC ...... *G06F 16/2272* (2019.01); *G06F 16/2443* (2019.01)

(58) Field of Classification Search
CPC .......... G06F 16/2272; G06F 16/2443
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |

(Continued)

*Primary Examiner* — Hosain T Alam
*Assistant Examiner* — Chongsuh Park
(74) *Attorney, Agent, or Firm* — Lorenz & Kopf, LLP

(57) ABSTRACT

Devices, systems and methods are provided for ordering records at a database system. An instance of a virtual application presented at a client device coupled to the database system over a network provides a graphical user interface (GUI) element populated using a sorting rule table that maintains user-configured sorting rule criteria for each custom sorting rule of a plurality of different sorting rules configured at the database system. In response to the user selection of a first custom sorting rule via the GUI element, the virtual application provides graphical indication of an ordered listing of the records at the database system ordered by a user-configured field of the records associated with the first custom sorting rule in accordance with a user-configured sort order associated with the first custom sorting rule using a search index built in accordance with the user-configured sorting rule criteria for the custom sorting rules.

15 Claims, 12 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,591,295 B1 * | 7/2003 | Diamond ............... G06F 16/40 707/999.102 |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0024675 A1 * | 1/2009 | Hewitt ............... G06F 21/606 |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

* cited by examiner

DATABASE SYSTEMS AND METHODS FOR CUSTOM SORTING RECORDS

TECHNICAL FIELD

One or more implementations relate to the field of database systems, and more specifically, to user-configurable custom sorting of records at a database system.

BACKGROUND

Modern software development has evolved towards web applications or cloud-based applications that provide access to data and services via the Internet or other networks. For example, social media platforms and other collaborative web sites allow users to exchange direct messages or form groups for broadcasting messages and collaborating with one another. In business environments and customer relationship management (CRM) contexts, communication platforms facilitate users sharing information about sales opportunities or other issues surrounding products or services and track changes to projects and sales opportunities by receiving broadcast updates about coworkers, files, and other project related data objects.

In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware.

Multi-tenant cloud-based architectures have been developed to support multiple user groups (also referred to as "organizations" or "tenants") using a common hardware and software platform. Some multi-tenant database systems include an application platform that supports a customizable user experience, for example, to create custom applications, web pages, reports, tables, functions, and/or other objects or features. However, the underlying search features and search result sorting functionality supported by the application platform may be inflexible or limit a developer or organization from achieving the full range of customizations they would like to implement for the customers, which could also result in an unsatisfactory user experience. Accordingly, it is desirable to increase potential customizations to increase productivity and improve user experiences.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
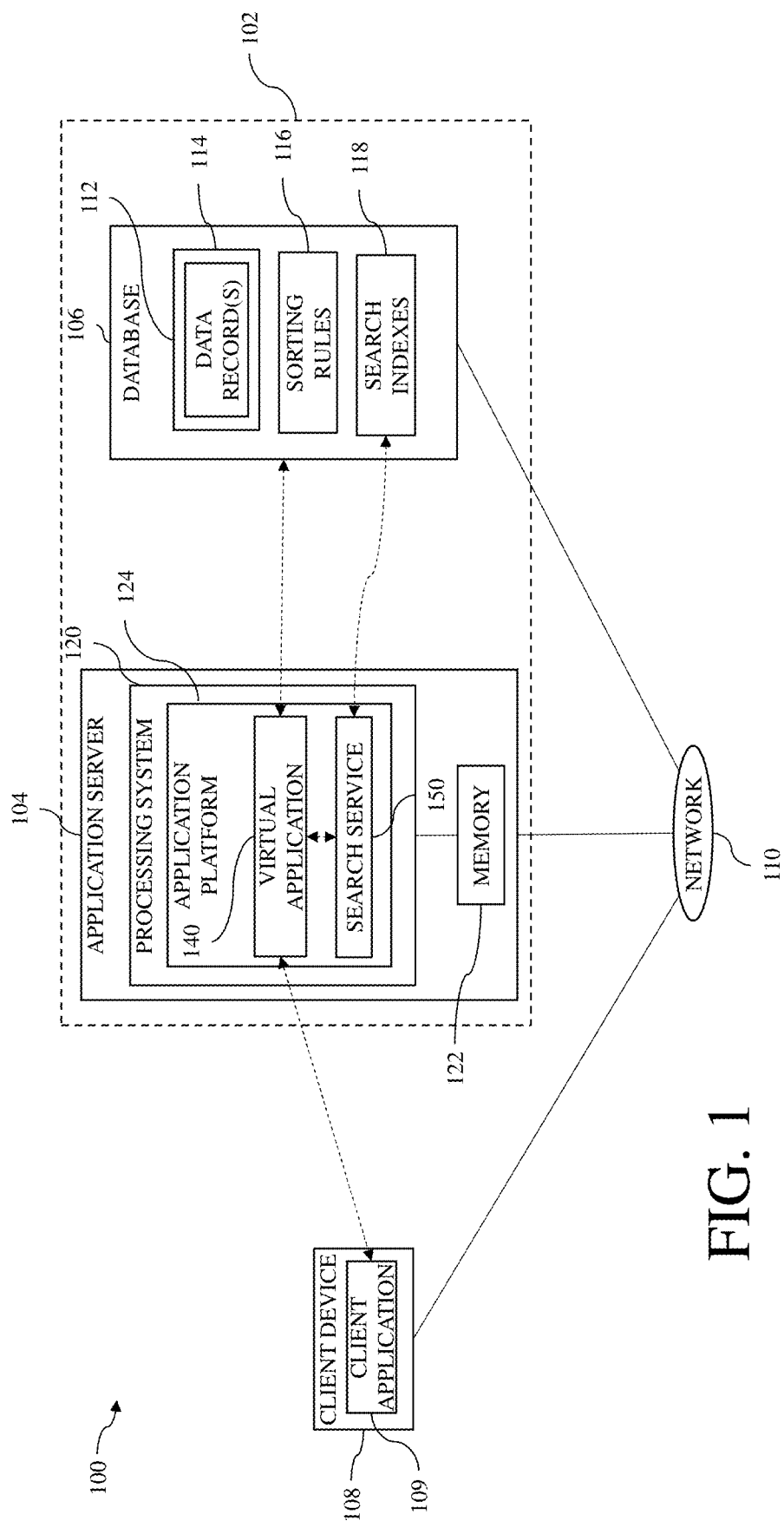
FIG. 1 is a block diagram illustrating a computing system that supports user-configurable custom sorting of records according to some example implementations.

The following description describes implementations for enabling user-configurable and customizable sorting rules that can be applied to different fields of records at a database system to sort or order records, rather than being limited to predefined or default sorting rules (e.g., best match, relevance or the like) or predefined fields to which those sorting rules may be applied. In this regard, a user may define or otherwise configure the particular field of a particular type of record that the user wants to sort by as well as the manner in which the user wants to order values for the user-configured field. Thereafter, when viewing search results or another subset of records at the database system, a user-configured custom sorting rule may be selected or otherwise activated to sort those records based on their respective field values for the user-configured field associated with the custom sorting rule, with the sorted records being ordered in accordance with the user-configured sort order (e.g., ascending, descending, alphabetical, reverse alphabetical, etc.) associated with the custom sorting rule. In this regard, by virtue of the subject matter described herein, user-, organization- or tenant-specific custom sorting rules maybe supported to enable sorting on custom, user-, organization- or tenant-specific fields associated with custom, user-, organization- or tenant-specific records or database objects associated with that particular user, organization or tenant, rather than limiting sorting of those records to predefined sorting rules for sorting on predefined fields associated with those records.

As described in greater detail below, a graphical user interface (GUI) is provided within an instance of a virtual application presented at a client device coupled to the database system over a network, with the GUI element being manipulable to select a custom sorting rule from among any number of different custom or default sorting rules previously configured at the database system. For example, the GUI element may be realized as a picklist, a drop-down menu, or other GUI element that, when selected, is populated with selectable entries or other indicia corresponding to the different custom sorting rules associated with a particular user, organization or tenant that are maintained in a sorting rule table at the database system. In this regard, for each custom sorting rule of the different sorting rules, the sorting rule table includes a respective entry maintaining user-configured sorting rule criteria associated with the respective custom sorting rule. In response to receiving user selection of one of the custom sorting rules via the GUI element, an ordered listing of records that are ranked, sorted or otherwise ordered by their respective field values for the user-configured field of the records associated with the selected custom sorting rule in accordance with the user-configured sort order associated with the selected custom sorting rule. In exemplary implementations, the list of records ordered in the user-configured sort order by the field values for the user-configured sort by field are obtained using a search index that was built or otherwise generated in accordance with the user-configured sorting rule criteria for the different custom sorting rules associated with that particular user, organization or tenant. A graphical representation or other graphical indicia of at least the highest ranked subset of the ordered listing of records is provided within the instance of the virtual application responsive to the user selection of the custom sorting rule, thereby enabling the user to sort records that match or otherwise satisfy desired search key(s) and/or filter criteria in a customizable manner.

In exemplary implementations, to create or otherwise define a custom sorting rule, one or more GUI displays are provided that allow an administrator user associated with a particular organization or tenant to select or otherwise define the particular type of record or database object to with a particular sorting rule is to be applied, which may be a standard type of record or database object supported by an application platform or a custom type of record or database object previously defined for that particular user, organization or tenant. In response to user selection of the desired type of record or database object to which the custom sorting rule is to be applied, one or more GUI elements may be provided that allow the administrator user to select or otherwise define the particular field from among the potential sortable fields associated with the selected type of record or database object that they would like to sort records by. Responsive to user selection of the desired field for the custom sorting rule, metadata associated with that field may be utilized to identify the potential types of sort ordering that could be applied to the user-selected field based on the type of values maintained in the user-selected field (e.g., numerical values, text values, and/or the like), and corresponding GUI elements are provided that allow the administrator user to select or otherwise define the particular sort order to be applied to the field values for the user-selected field when ordering records by that user-selected field. Once the sorting rule criteria for the custom sorting rule are defined, the search index may be rebuilt or otherwise updated to account for the new custom sorting rule, and the sorting rule table at the database system is updated to include an entry that maintains the user-configured sorting rule criteria in association with the particular user, organization or tenant.

For example, in one implementation, the subject matter described herein enables sorting by a custom field of product records associated with a particular user, organization or tenant in an e-commerce related virtual application, where that custom field is specific to that particular user, organization or tenant. In this regard, an administrator level user associated with that particular user, organization or tenant may utilize an instance of a virtual application supported by an application platform to create or otherwise define a custom field to be associated with their product records, and then create or otherwise define a custom sorting rule for sorting by values for that custom field of product records associated with the particular user, organization or tenant in accordance with a sort order defined by the administrator user based on the type of value defined for that custom field. Thereafter, when a customer searches for products within an instance of the e-commerce related virtual application, a GUI element is provided that allows the customer to sort the search results on the custom field in the configured sort order, thereby improving the customer experience, and thereby increases the likelihood of the particular user, organization or tenant achieving their business objectives in the context of the e-commerce related virtual application.

FIG. 1 depicts an exemplary computing system 100 capable of supporting user-configurable custom sorting of records maintained at a database system 102. It should be appreciated that FIG. 1 is a simplified representation of a computing system 100 and is not intended to be limiting. In the illustrated implementation, the database system 102 includes one or more servers 104 that users of client devices 108 may interact with, over a communications network 110 (e.g., the Internet or any sort or combination of wired and/or wireless computer network, a cellular network, a mobile broadband network, a radio network, or the like), to view, access or obtain data or other information from one or more data records 114 at a database 106 or other repository associated with the database system 102.

In one or more exemplary implementations, the database system 102 includes one or more application servers 104 that support an application platform 124 capable of providing instances of virtual applications 140, over the network 110, to any number of client devices 108 that users may interact with to obtain data or other information from one or more data records 114 maintained in one or more data tables 112 at the database 106 associated with the database system 102. For example, the database 106 may maintain, on behalf of a user, tenant, organization or other resource owner, data records 114 entered or created by that resource owner (or users associated therewith), files, objects or other records uploaded by the resource owner (or users associated therewith), and/or files, objects or other records automatically generated by one or more computing processes (e.g., by the server 104 based on user input or other records or files stored in the database 106). In this regard, in one or more implementations, the database system 102 is realized as an on-demand multi-tenant database system that is capable of dynamically creating and supporting virtual applications 140 based upon data from a common resource database 106 that is shared between multiple tenants, which may alternatively be referred to herein as a multi-tenant database. Data and services generated by the virtual applications 140 may be provided via the network 110 to any number of client devices, as desired, where instances of the virtual application may be suitably generated at run-time (or on-demand) using a common application platform 124 that securely provides access to the data in the database 106 for each of the various tenants subscribing to the multi-tenant system.

The application server 104 generally represents the one or more server computing devices, server computing systems or other combination of processing logic, circuitry, hardware, and/or other components configured to support remote access to data records maintained in the data tables 112 at the database 106 via the network 110. Although not illustrated in FIG. 1, in practice, the database system 102 may include any number of application servers 104 in concert with a load balancer that manages the distribution of network traffic across different servers 104 of the database system 102.

In exemplary implementations, the application server 104 generally includes at least one processing system 120, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the application server 104 may also include one or more communications interfaces, which include any number of transmitters, receiver, transceivers, wired network interface controllers (e.g., an Ethernet adapter), wireless adapters or another suitable network interface that supports communications to/from the network 110 coupled thereto. The application server 104 also includes or otherwise accesses a data storage element 122 (or memory), and depending on the implementation, the memory 122 may be realized as a random-access memory (RAM), read only memory (ROM), flash memory, magnetic or optical mass storage, or any other suitable non-transitory short- or long-term data storage or other computer-readable media, and/or any suitable combination thereof. In exemplary implementations, the memory 122 stores code or other computer-executable programming instructions that, when executed by the processing system 120, are configurable to cause the processing system 120 to support or otherwise facilitate the application platform 124 and the subject matter described herein.

The client device 108 generally represents an electronic device coupled to the network 110 that may be utilized by a user to access an instance of the virtual application 140 using an application 109 executing on or at the client device 108. In practice, the client device 108 can be realized as any sort of personal computer, mobile telephone, tablet or other network-enabled electronic device coupled to the network 110 that executes or otherwise supports a web browser or other client application 109 that allows a user to access one or more GUI displays provided by the virtual application 140. In exemplary implementations, the client device 108 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 108. The illustrated client device 108 executes or otherwise supports a client application 109 that communicates with the application platform 124 provided by the processing system 120 at the application server 104 to access an instance of the virtual application 140 using a networking protocol. In some implementations, the client application 109 is realized as a web browser or similar local client application executed by the client device 108 that contacts the application platform 124 at the application server 104 using a networking protocol, such as the hypertext transport protocol (HTTP). In this manner, in one or more implementations, the client application 109 may be utilized to access or otherwise initiate an instance of a virtual application 140 hosted by the database system 102, where the virtual application 140 provides one or more web page GUI displays within the client application 109 that include GUI elements for interfacing and/or interacting with records 114 maintained at the database 106.

In exemplary embodiments, the database 106 stores or otherwise maintains data for integration with or invocation by a virtual application 140 in objects organized in object tables 112. In this regard, the database 106 may include any number of different object tables 112 configured to store or otherwise maintain alphanumeric values or other descriptive information that define a particular instance of a respective type of object associated with a respective object table 112. For example, the virtual application may support a number of different types of objects that may be incorporated into or otherwise depicted or manipulated by the virtual application, with each different type of object having a corresponding object table 112 that includes columns or fields corresponding to the different parameters or criteria that define a particular instance of that object. In some implementations, the database 106 stores or otherwise maintains application objects (e.g., an application object type) where the application object table 112 includes columns or fields corresponding to the different parameters or criteria that define a particular virtual application 140 capable of being generated or otherwise provided by the application platform 124 on a client device 108. In this regard, the database 106 may also store or maintain graphical user interface (GUI) objects that may be associated with or referenced by a particular application object and include columns or fields that define the layout, sequencing, and other characteristics of GUI displays to be presented by the application platform 124 on a client device 108 in conjunction with that application 140.

In exemplary implementations, the database 106 stores or otherwise maintains additional database objects for association and/or integration with a virtual application 140, which may include custom objects and/or standard objects. For example, an administrator user associated with a particular resource owner may utilize an instance of a virtual application 140 to create or otherwise define a new custom field to be added to or associated with a standard object, or define a new custom object type that includes one or more new custom fields associated therewith. In this regard, the database 106 may also store or otherwise maintain metadata that defines or describes the fields, process flows, workflows, formulas, business logic, structure and other database components or constructs that may be associated with a particular application database object. In various implementations, the database 106 may also store or otherwise maintain validation rules providing validation criteria for one or more fields (or columns) of a particular database object type, such as, minimum and/or maximum values for a particular field, a range of allowable values for the particular field, a set of allowable values for a particular field, or the like, along with workflow rules or logical criteria associated with respective types of database object types that define actions, triggers, or other logical criteria or operations that may be performed or otherwise applied to entries in the various database object tables 112 (e.g., in response to creation, changes, or updates to a record in an object table 112).

As described in greater detail below, in exemplary implementations, the database 106 stores or otherwise maintains a sorting rule table 116 that includes entries corresponding to different custom sorting rules associated with a particular resource owner. In this regard, an entry for a custom sorting rule in the sorting rule table 116 maintains user-configured sorting rule criteria associated with that custom sorting rule (e.g., identification of the type of database object or record to which the custom sorting rule is to be applied, the field of that particular type of database object or record by which to sort, and the manner or order in which to rank or sort by that field) in association with one or more unique identifiers associated with the particular resource owner. For example, an instance of a virtual application 140 may provide, within the client application 109, one more GUI displays including one or more GUI elements manipulable by a user of the client device 108 to input the custom sorting rule criteria and create or otherwise define a new custom sorting rule to be supported for a particular resource owner. After defining the criteria to be associated with the custom sorting rule, the virtual application 140 creates a corresponding entry in the sorting rule table 116 that stores the user-configured sorting rule criteria for that custom sorting rule.

In exemplary implementations, the application platform 124 includes or otherwise supports a search service 150 that is configurable to utilize the user-configured sorting rule criteria for the custom sorting rules associated with a particular resource owner maintained in the sorting rule table 116 to build a corresponding search index 118 for the subset of records 114 associated with that resource owner that is structured or otherwise arranged in accordance with that resource owner's custom sorting rules. The search service 150 stores or otherwise maintains the search indexes 118 associated with the different resource owners supported by the database system 102 in the database 106 for subsequent reference when performing searches for records associated with a particular resource owner and sorting the search results in accordance with a custom sorting rule for a particular resource owner, as described in greater detail below.

Figure 2:
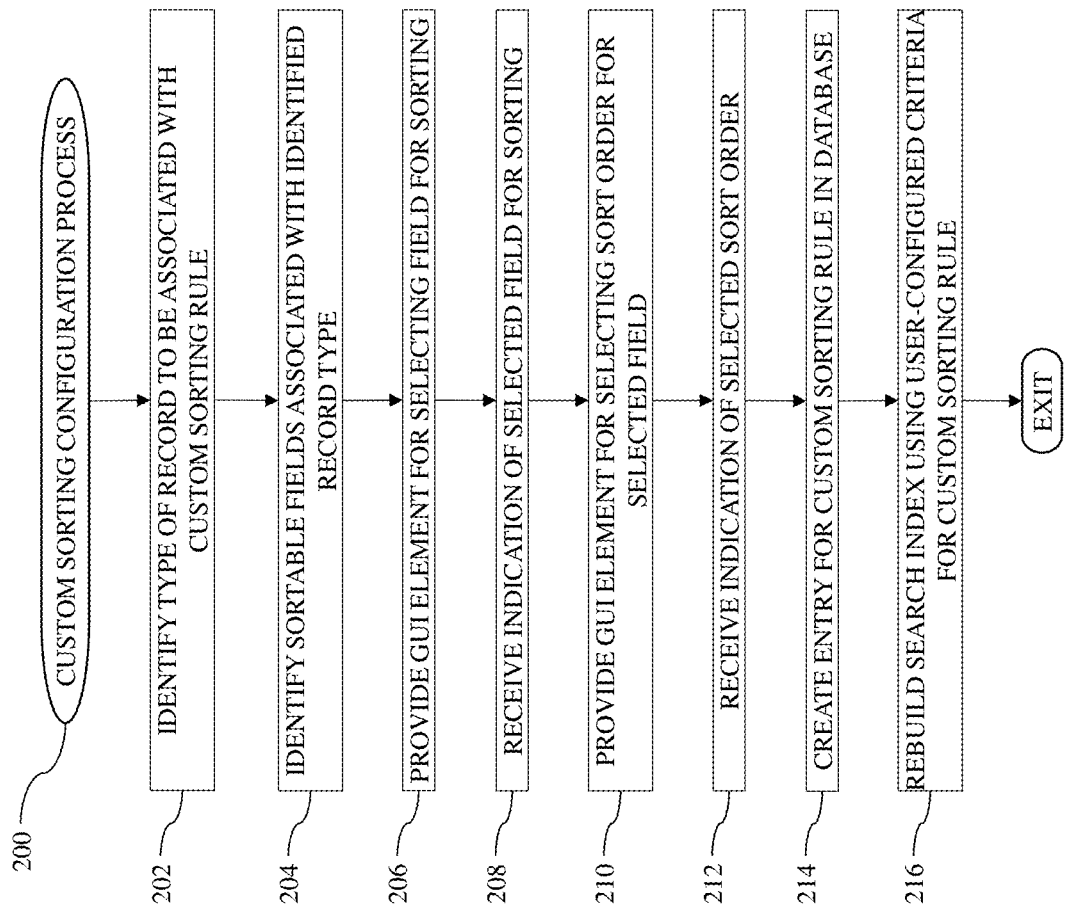
FIG. 2 is a flow diagram illustrating a custom sorting configuration process suitable for implementation in connection with the computing system of FIG. 1 according to some example implementations.

FIG. 2 depicts an exemplary custom sorting configuration process 200 suitable for implementation by a database system to support custom sorting of records maintained at the database system and perform additional tasks, functions, and/or operations described herein. For illustrative purposes, the following description may refer to elements mentioned above in connection with FIG. 1. It should be appreciated that the custom sorting configuration process 200 may include any number of additional or alternative tasks, the tasks need not be performed in the illustrated order and/or the tasks may be performed concurrently, and/or the custom sorting configuration process 200 may be incorporated into a more comprehensive procedure or process having additional functionality not described in detail herein. Moreover, one or more of the tasks shown and described in the context of FIG. 2 could be omitted from a practical implementation of the custom sorting configuration process 200 as long as the intended overall functionality remains intact.

Referring to FIG. 2 with continued reference to FIG. 1, in exemplary implementations, the custom sorting configuration process 200 is performed to create or otherwise instantiate a new custom sorting rule in connection with an administrative user utilizing an instance of a virtual application 140 to setup or otherwise configure the data records 114 or database objects that are maintained in the database 106 to customize the virtual application 140 for other users or customers associated with a particular resource owner. For example, an administrator user may initiate the custom sorting configuration process 200 when configuring the data records 114 or database objects associated with the particular resource owner that are available for incorporation into an e-commerce virtual application 140 in order to customize the e-commerce virtual application 140 for other users or customers. In this regard, in some implementations, the custom sorting configuration process 200 may be implemented or otherwise supported by a custom sorting service that is integrated with or otherwise incorporated into the virtual application 140 at the application platform 124. In other implementations, the custom sorting configuration process 200 may be implemented or otherwise supported by a custom sorting service that is realized as a standalone process or an application programming interface (API).

Referring to FIG. 2, the custom sorting configuration process 200 begins by identifying or otherwise determining the type of record to be associated with the new custom sorting rule to be created, (task 202). In some implementations, in the context of an e-commerce virtual application 140, the custom sorting configuration process 200 may automatically identify the product database object as the type of data record 114 to which the custom sorting rule is to be applied. That said, in other implementations, the custom sorting configuration process 200 may generate or otherwise provide one or more GUI displays within the client application 109 at the client device 108 that include GUI elements that are manipulable by a user of the client device 108 to provide indication of the database object types for which the user would like to create the new custom sorting rule. In this regard, in such implementations, the custom sorting configuration process 200 may analyze the metadata associated with the resource owner to identify the different types of database object types that are supported or otherwise enabled for that particular resource owner, which may include both standard database objects (e.g., types of database objects associated with the application platform 124 or virtual application 140 that are available across different resource owners) as well as custom database objects that are specific to that particular resource owner.

After receiving indication of the selected type of data record or otherwise identifying the type of data record that the custom sorting rule is to be applied to, the custom sorting configuration process 200 identifies or otherwise determines the potential sortable fields associated with the identified record type, generates or otherwise provides one or more GUI elements for selecting the desired field for sorting in connection with the new custom sorting rule and receives indication of the selected field for sorting via the one or more GUI elements (tasks 204, 206, 208). In this regard, the custom sorting configuration process 200 analyzes the metadata associated with the selected or identified database object type that is maintained in the database 106 to identify or otherwise determine what subset of data fields associated with that identified database object are capable of supporting sorting by that respective field. For example, the custom sorting configuration process 200 may identify the data fields that are designated as containing numerical values, currency values, text values or other alphanumeric characters or values as potential sortable data fields while filtering or otherwise excluding other data fields from the potential sortable fields, such as, for example, any fields that are designated as Boolean data fields. It should be noted that the potential sortable fields may include both standard data fields (e.g., default or preexisting fields of standard database objects that are available across different resource owners) as well as custom data fields (e.g., a custom data field added to a standard database object or associated with a custom database object).

After identifying the subset of potential sortable data fields associated with the selected type of record, the custom sorting configuration process 200 generates or otherwise provides one or more GUI elements within a GUI display at the client application 109 at the client device 108 that are manipulable to allow the user to input, select or otherwise identify the particular data field, from among the subset of potential sortable data fields, that the user would like to enable sorting by. For example, in one or more implementations, custom sorting configuration process 200 generates a picklist or drop-down menu GUI element that, when initially selected or activated, is automatically populated with a menu or listing of the potential sortable data fields of the selected database object type to which the custom sorting rule can be applied, with the custom sorting configuration process 200 receiving indication of the desired data field to which sorting is to be applied in response to user input selecting the respective data field from the menu or listing of potential sortable data fields. That said, it should be appreciated the subject matter is not limited to a picklist or drop-down menu GUI element, and in practice, other GUI elements (e.g., a group of radio buttons, checkboxes, or the like) may be utilized in an equivalent manner to enable selection of a desired field from among the potential sortable fields.

Still referring to FIG. 2, in exemplary implementations, the custom sorting configuration process 200 generates or otherwise provides one or more GUI elements for selecting the desired sort order to be applied to the values for the selected field for sorting and receives indication of the selected sort order for sorting by the selected field via the one or more GUI elements (tasks 210, 212). In this regard, the custom sorting configuration process 200 generates or otherwise provides one or more GUI elements within a GUI display at the client application 109 at the client device 108 that allows the user to indicate how the field values for the selected data field for sorting are to be ranked or otherwise ordered to sort records by that selected data field. The custom sorting configuration process 200 receives indication of the desired sort order to be applied from among the different potential sort orders for the selected data field in response to user input selecting the desired sort order via the GUI element(s). In some implementations, the custom sorting configuration process 200 identifies the different potential sort orders for the selected data field based on the metadata identifying the type of values maintained in the respective data field. For example, for numerical values, the custom sorting configuration process 200 may identify ascending or descending as the potential sort orders, while for text values, the custom sorting configuration process 200 may identify alphabetical or reverse alphabetical as the potential sort orders. That said, in other implementations, the custom sorting configuration process 200 may enable selection between ascending or descending for any type of value maintained in the respective data field while providing one or more GUI elements that allow the user to input or otherwise modify a label or definition for the sort order appropriate to the type of value maintained in the respective data field.

After receiving indication of the selected data field for the new custom sorting rule and the selected sort order to be utilized to rank or order values for that selected data field in connection with the new custom sorting rule, in exemplary implementations, the custom sorting configuration process 200 creates an entry for the new custom sorting rule in the database that maintains the user-configured criteria associated with the new custom sorting rule in association with the custom sorting rule (task 214). For example, the custom sorting configuration process 200 may create an entry in the sorting rule table 116 corresponding to the new custom sorting rule that includes or otherwise maintains one or more unique identifiers associated with the resource owner to which the new custom sorting rule belongs, identification or indication of the particular type of data record 114 to which the new custom sorting rule is to be applied, identification or indication of the user-configured selected data field of that particular type of data record 114 by which the data records 114 associated with the resource owner are to be ordered, ranked or sorted in connection with the new custom sorting rule, and identification or indication of the user-configured selected sort order by which to order, rank or otherwise sort the values of that user-configured selected data field of the data records 114 associated with the resource owner in connection with the new custom sorting rule.

In one or more implementations, after creating or otherwise instantiating the new custom sorting rule, the custom sorting configuration process 200 initiates rebuilding or regeneration of a search index for searching data records associated with a resource owner using the user-configured criteria for the new custom sorting rule (task 216). For example, the custom sorting configuration process 200 may provide one or more GUI elements within the client application 109 that are manipulable by the user to initiate rebuild of a search index for the resource owner, where in response to user selection of a GUI element to rebuild the search index, the custom sorting configuration process 200 communicates with a search service 150 of the application platform 124 to rebuild the resource owner's search index 118 to reflect the new custom sorting rule. In this regard, the custom sorting configuration process 200 may retrieve the user-configured criteria associated with the different sorting rules associated with the resource owner that are maintained in the sorting rule table 116 of the database 106 to the search service 150 in connection with an instruction to rebuild the resource owner's search index 118 in accordance with the different user-configured criteria associated with the different sorting rules associated with the resource owner. In response, the search service 150 rebuilds the search index 118 by updating the definition of sortable fields associated with the search index 118 to include indicia of the field(s) associated with the new custom sorting rule and updating the definitions of data records included in the search index 118 to indicate the respective record field value(s) for the sortable field(s) associated with the new custom sorting rule, and then stores the rebuilt search index 118 that reflects the new custom sorting rule for the resource owner in the database 106.

Figure 3:
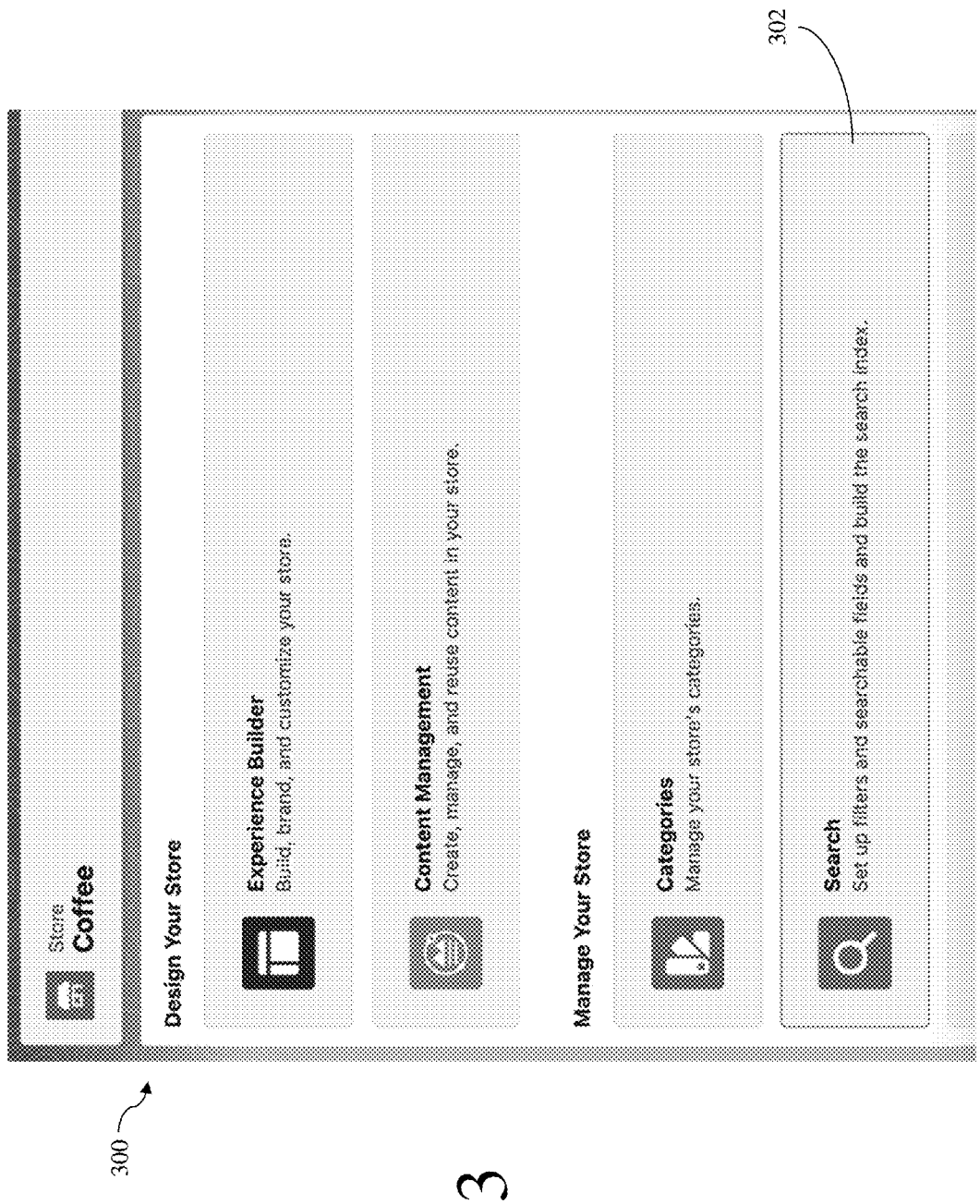
FIGS. 3-6 depict an exemplary sequence of graphical user interface (GUI) displays suitable for presentation on a client device in connection with the custom sorting configuration process of FIG. 2 according to an example implementation.

FIGS. 3-7 depict an exemplary sequence of web page GUI displays that may be generated or otherwise presented by an instance of an e-commerce virtual application 140 within a client application 109 at a client device 108 in connection with an exemplary implementation of the custom sorting configuration process 200. FIG. 3 depicts an exemplary configuration menu GUI display 300 that includes a hyperlink or other GUI element 302 selectable by an administrative user associated with a resource owner to configure custom sorting rules to be supported by the resource owner's instances of the e-commerce virtual application 140 and rebuild the search index 118 associated with the resource owner to reflect the resource owner's custom sorting rules.

Figure 4:
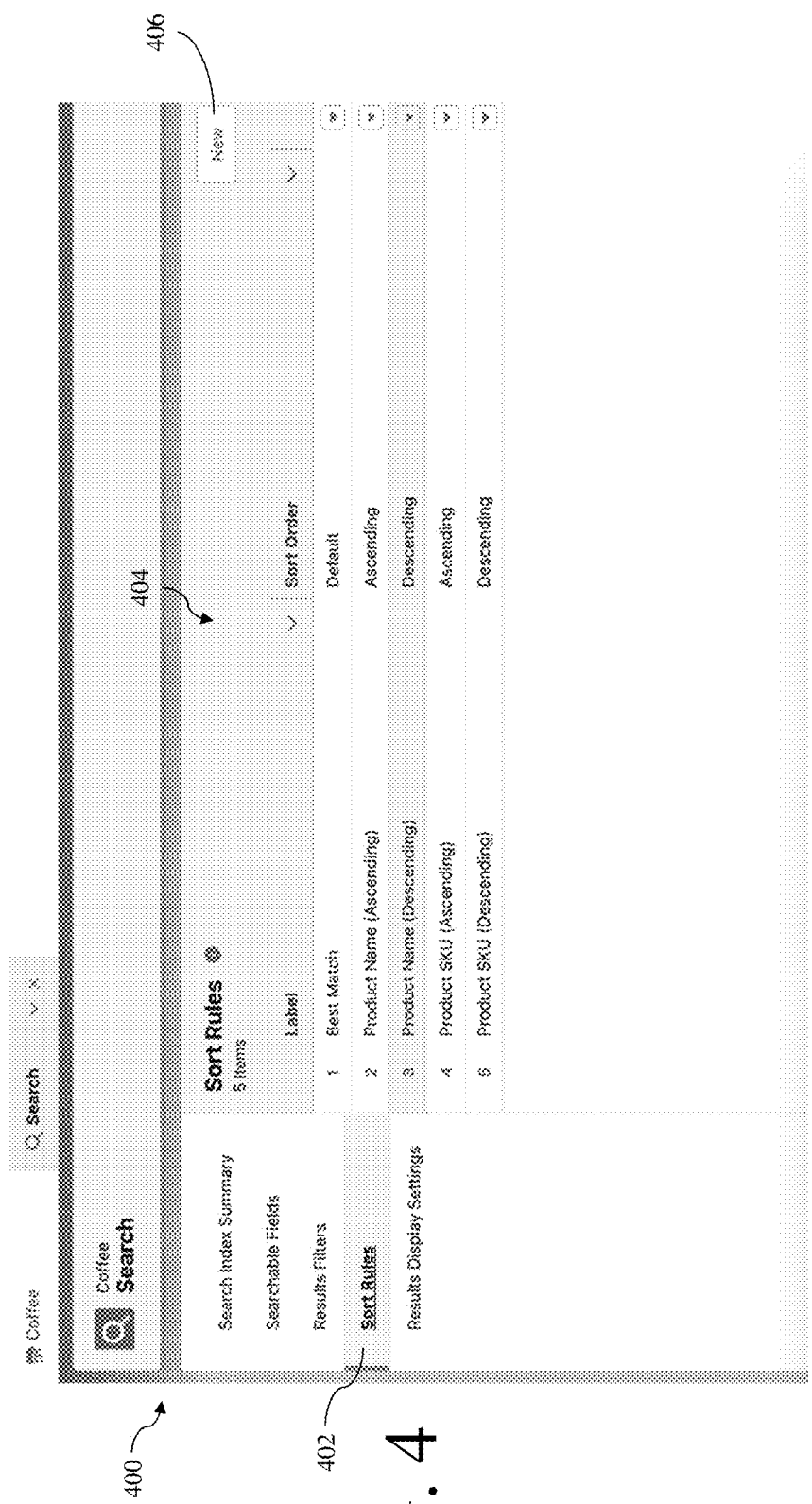

FIG. 4 depicts a sorting rule management GUI display 400 that may be generated or otherwise presented by the e-commerce virtual application 140 after selection of the GUI element 302 to configure search functionality to be supported by the resource owner's instances of the e-commerce virtual application 140 and selection of a sorting rule hyperlink or other selectable GUI element 402 in a sidebar menu panel to view a listing 404 of the existing sorting rules for the resource owner. To generate the sorting rule listing 404, the custom sorting configuration process 200 may access or otherwise retrieve information from the subset of entries in the sorting rule table 116 that are associated with the resource owner. In this regard, FIG. 4 depicts a scenario where the sorting rule table 116 is configured to support a best match sorting rule (which may be a default sorting rule supported by the application platform 124 and/or the search service 150 for all resource owners) along with user-configured custom sorting rules for the resource owner includes a first custom sorting rule to sort by a product name field of product records in an ascending (or alphabetical) order, a second custom sorting rule to sort by the product name field of product records in a descending (or reverse alphabetical) order, a third custom sorting rule to sort by a product stock keeping unit (SKU) field of product records in an ascending order and a fourth custom sorting rule to sort by the product SKU field of product records in a descending order.

Figure 5:
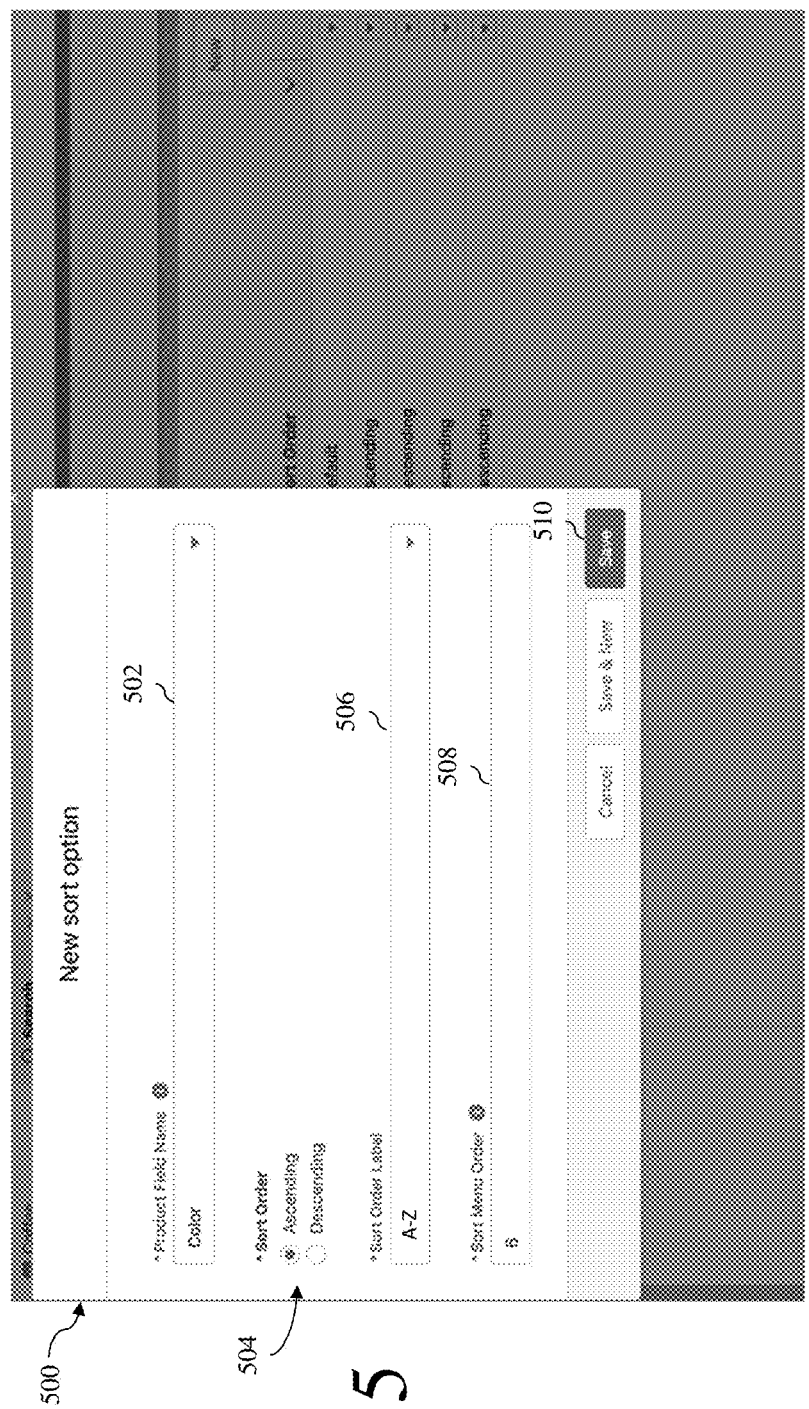

Referring now to FIG. 5 with reference to FIG. 4, in response to selection of a button or similar selectable GUI element 406 to create a new custom sorting rule, the custom sorting configuration process 200 generates or otherwise provides a new custom sorting rule definition GUI display 500 that includes GUI elements 502, 504, 506, 508 that are manipulable by the user to input or otherwise define the user-configured criteria to be associated with the new custom sorting rule. In the illustrated implementation, the new custom sorting rule definition GUI display 500 includes a picklist or drop-down menu GUI element 502 that, when selected by the user, provides a menu or listing of the subset of data fields associated with the resource owner's product data records. In this regard, FIG. 5 depicts the state of the drop-down menu GUI element 502 after receiving user selection of the color custom data field associated with the resource owner's product data records as the field to be associated with the new custom sorting rule.

The new custom sorting rule definition GUI display 500 also includes a group of radio buttons 504 that are manipulable by the user to input or otherwise select whether the user would like to sort values for the color custom data field of the product data records in an ascending or descending order. In this regard, FIG. 5 depicts the state of the radio button group 504 after receiving user selection of ascending as the sort order to be applied to values of the color custom data field associated with the resource owner's product data records in connection with the new custom sorting rule.

Still referring to FIG. 5, the new custom sorting rule definition GUI display 500 also includes a picklist or drop-down menu GUI element 506 that, when selected by the user, provides a menu or listing of potential labels to be associated new custom sorting rule and utilized when providing graphical indicia of the new custom sorting rule to customers or users of instances of the e-commerce virtual application 140 associated with the resource owner. For example, the drop-down menu GUI element 506 may be configured to allow the user to select from among a number of different potential sorting rule labels, including, without limitation, ascending, descending, low to high (or low-high), high to low (or high-low), A-Z (or alphabetical), Z-A (or reverse alphabetical) or the like. In this regard, FIG. 5 depicts the state of the drop-down menu GUI element 506 after receiving user selection of A-Z as the label to be presented to users of instances of the e-commerce virtual application 140 associated with the resource owner in connection with the new custom sorting rule. The new custom sorting rule definition GUI display 500 also includes a GUI element 508 that allows the user to input or otherwise define a sorting rule menu order to be associated with the new custom sorting rule when depicted in a drop-down menu or other listing that allows a user to select the desired sorting rule from among the existing sorting rules for the resource owner. In this regard, FIG. 5 depicts the state of the GUI element 508 that indicates the new custom sorting rule with be presented sixth in the menu or listing of supported sorting rules.

In response to selection of a button or similar GUI element 510 on the custom sorting rule definition GUI display 500 to save the custom sorting rule, the e-commerce virtual application 140 creates a corresponding entry for the new custom sorting rule in the sorting rule table 116 that maintains the user-configured value for the sorting rule data field indicated by the GUI element 502, the user-configured sort order value indicated by the GUI element 504, the user-configured sorting rule label indicated by the GUI element 506, and the value for the sorting rule menu order indicated by the GUI element 508 in association with one another. Additionally, the entry for the new custom sorting rule in the sorting rule table 116 includes one or more unique identifiers associated with the resource owner for which the custom sorting rule is to be supported, thereby maintaining an association between the resource owner and the new custom sorting rule.

Figure 6:
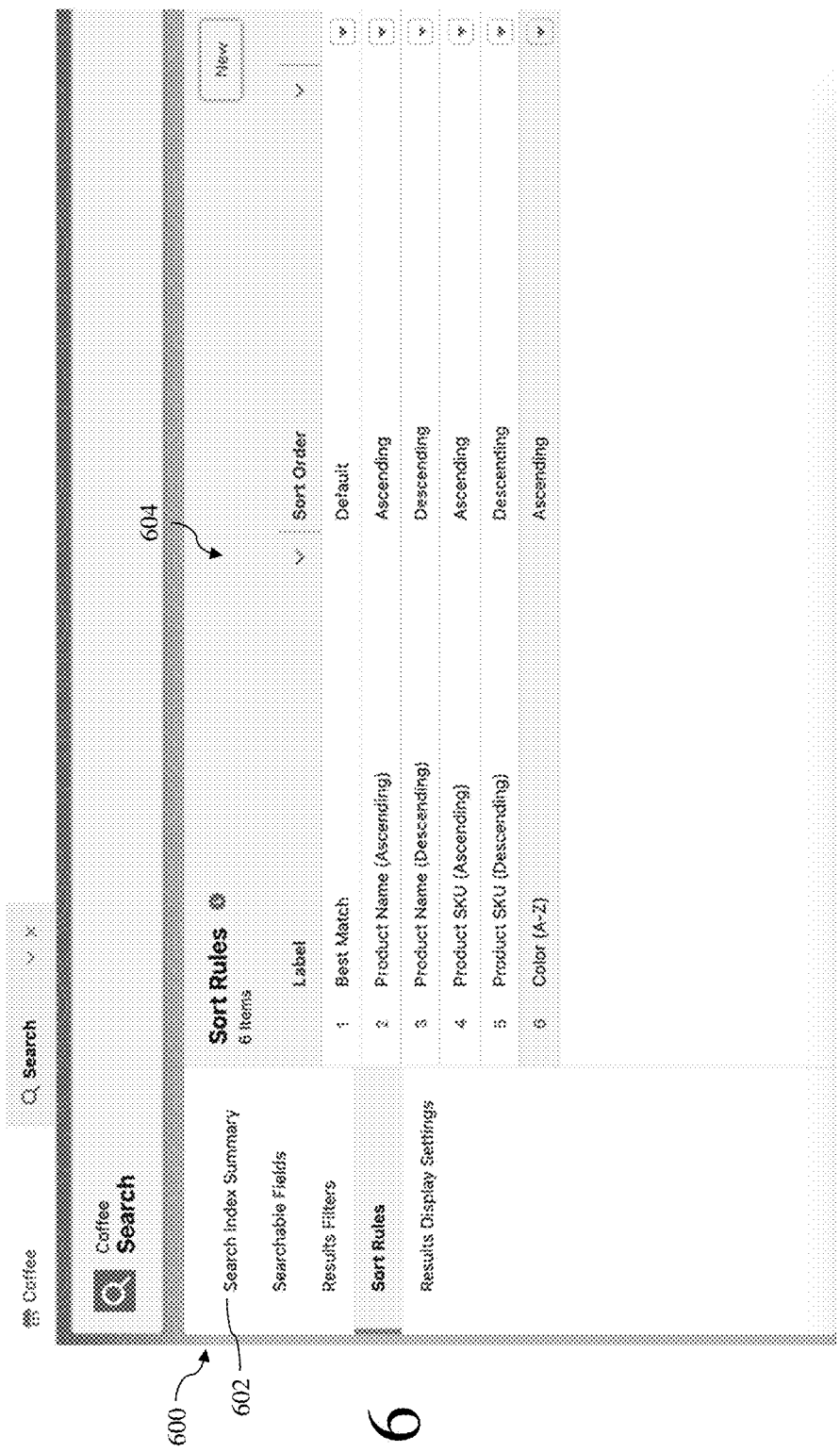

FIG. 6 depicts an updated sorting rule management GUI display 600 that may be generated or otherwise presented by the e-commerce virtual application 140 after selection of a GUI element 510 to save or otherwise instantiate the new custom sorting rule in the database 106. As shown, the new custom sorting rule for sorting by the color data field in an ascending order labeled A-Z is depicted sixth in the updated listing 604 of supported sorting rules for the resource owner. In some implementations, the custom sorting configuration process 200 may automatically initiate rebuilding of the search index for the resource owner in response to the user selecting the GUI element 510 to save the new custom sorting rule to the database 106. That said, in other implementations, the user may select a search index management hyperlink or other selectable GUI element 602 in a sidebar menu panel to cause the instance of the e-commerce virtual application 140 to provide one or more GUI display including one or more GUI elements that are manipulable by the user to manually initiate rebuilding of the resource owner's search index 118.

Figure 7:
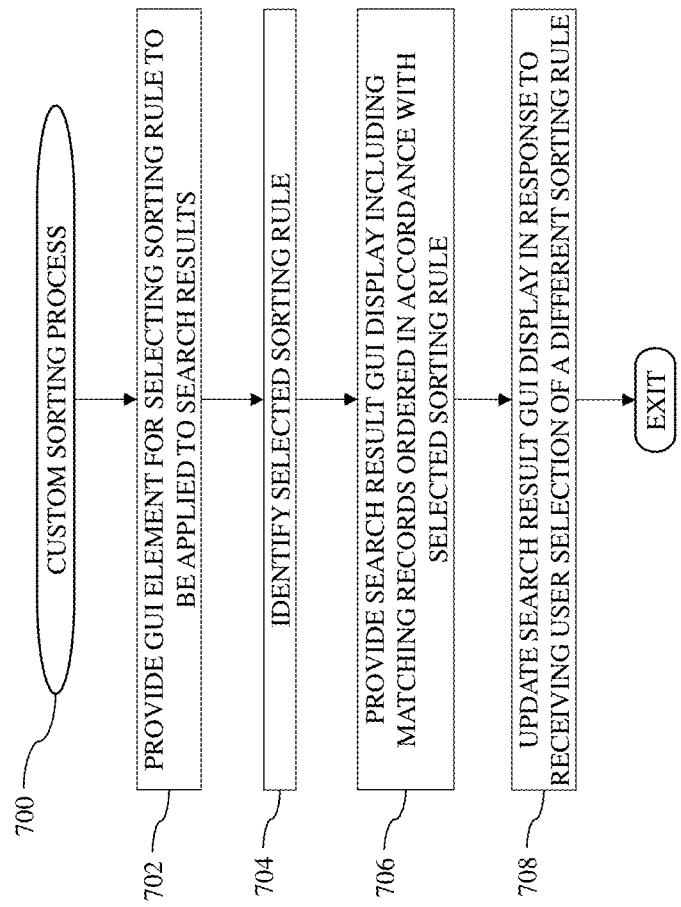
FIG. 7 is a flow diagram illustrating a custom sorting process suitable for implementation in connection with the computing system of FIG. 1 according to some example implementations.

FIG. 7 depicts an exemplary custom sorting process 700 suitable for implementation by a database system to sort records in accordance with a custom sorting rule and perform additional tasks, functions, and/or operations described herein. For illustrative purposes, the following description may refer to elements mentioned above in connection with FIG. 1. It should be appreciated that the custom sorting process 700 may include any number of additional or alternative tasks, the tasks need not be performed in the illustrated order and/or the tasks may be performed concurrently, and/or the custom sorting process 700 may be incorporated into a more comprehensive procedure or process having additional functionality not described in detail herein. Moreover, one or more of the tasks shown and described in the context of FIG. 7 could be omitted from a practical implementation of the custom sorting process 700 as long as the intended overall functionality remains intact.

Referring to FIG. 7 with continued reference to FIG. 1, in exemplary implementations, the custom sorting process 700 is performed in connection with a user utilizing an instance of a virtual application 140 associated with a particular resource owner to view, access or otherwise interact with data records 114 or database objects that are maintained in the database 106 in association with that resource owner. For example, the custom sorting process 700 may be performed in connection with a customer or another end user utilizing an instance of an e-commerce virtual application 140 associated with a particular resource owner to view and order products from that resource owner. In this regard, the instance of the e-commerce virtual application 140 may be customized for the particular resource owner using custom database objects and/or other metadata associated with the particular resource owner configured to customize the user experience of the e-commerce virtual application 140.

In one or more exemplary implementations, the custom sorting process 700 is performed in connection with a customer or other user utilizing the search service 150 or other search functionality incorporated into the virtual application 140 to sort search results (e.g., the subset of the resource owner's data records 114 matching the user's input search key). In such implementations, the virtual application 140 and/or the custom sorting process 700 may generate or otherwise provide a text box or similar input GUI element within a GUI display provided within the client application 109 for receiving a user input search key from the user of the client device 108. In response to receiving a search key from the user via the GUI element, the virtual application 140 provides the input search key to the search service 150, which, in turn, utilizes the search index 118 associated with the resource owner to identify the subset of resource owner's data records 114 that match or otherwise correspond to the input search key. The search service 150 may provide indicia of the subset of matching data records 114 to the virtual application 140, which, in turn, may utilize the indicia of matching data records 114 to query the data tables 112 in the database 106 to retrieve values or other data from one or more fields of the matching data records 114 (or a subset thereof) and generate a corresponding search result GUI display including graphical representations of matching data records 114.

Still referring to FIG. 7, the custom sorting process 700 generates or otherwise provides one or more GUI elements that enable a user to select, from among the different sorting rules supported for a particular resource owner, a desired sorting rule to be applied to search results prior to generating a search result GUI display (task 702). For example, in exemplary implementations, the virtual application 140 accesses the sorting rule table 116 in the database 106 to identify the different sorting rules supported for the particular resource owner associated with a particular instance of the virtual application 140 and then generates a picklist or drop-down menu GUI element that is populated with entries corresponding to the different sorting rules supported for that particular resource owner.

The custom sorting process 700 continues by identifying the selected sorting rule to be applied and then generates or otherwise provides a GUI display including at least a subset of the data records associated with the resource owner ordered in accordance with the selected sorting rule (tasks 704, 706). In this regard, a custom sorting service that is integrated with or otherwise incorporated into the virtual application 140 at the application platform 124 may identify or otherwise determine the selected sorting rule to be applied based on the current state of the picklist or drop-down menu GUI element, and then provide indicia of the selected sorting rule to the search service 150 to identify or otherwise obtain a listing of the data records 114 associated with the resource owner that match the input search key which are ordered or ranked in accordance with the selected sorting rule, for example, by ranking the subset of matching data records 114 by their values associated with the selected data field in the desired sort order.

In some implementations, by default, the custom sorting process 700 may identify the sorting rule in the sorting rule table having the highest priority or rank for the sorting rule menu order associated therewith as the selected sorting rule to be applied prior to a user manipulating the sorting rule drop-down menu GUI element to select a different sorting rule. For example, the custom sorting process 700 may analyze sorting rule menu order data field in the sorting rule table 116 for the different sorting rules supported for the particular resource owner to identify the sorting rule entry having the highest priority or rank (e.g., a value of 1 for the sorting rule menu order field) as the initially selected sorting rule. The sorting data field and sort order associated with the selected sorting rule is provided to the search service 150, which, in turn, utilizes the search index 118 associated with the resource owner to identify the subset of the resource owner's data records 114 that match the input search key and order the records by the sorting data field in the defined sort order.

Still referring to FIG. 7, the custom sorting process 700 dynamically updates the search result GUI display substantially in real-time in response to receiving user selection of a different sorting rule (task 708). In this regard, the user of the client device 108 may manipulate the sorting rule drop-down menu GUI element within the search result GUI display provided by the virtual application 140 to select a different sorting rule, which, in turn, results in the custom sorting service identifying the currently selected sorting rule based on the current state of the sorting rule drop-down menu GUI element, retrieving the criteria associated with the selected sorting rule and providing the criteria associated with the selected sorting rule to the search service 150 to obtain an updated order or ranking of the subset of matching data records 114 reordered by the currently selected sorting data field with the desired sort order associated with the current selection. For example, in response to the user selecting a custom sorting rule, the custom sorting service obtains the user-configured sorting data field and user-configured sort order associated with the custom sorting rule and provides indicia of the user-configured criteria to the search service 150 which utilizes the search index 118 built in accordance with the resource owner's custom sorting rules to obtain an ordered listing of the subset of matching data records 114 ranked by their respective values for the user-configured sorting data field in the user-configured sort order. The virtual application 140 may then dynamically generate an updated search result GUI display that includes graphical representations of the subset of matching data records 114 reordered in the selected manner. In this manner, the custom sorting rules defined for the resource owner allow the customer or other end user of an instance of the virtual application 140 associated with the resource owner to reorder data records 114 by values for different custom data fields in different, customizable orders.

Figure 8:
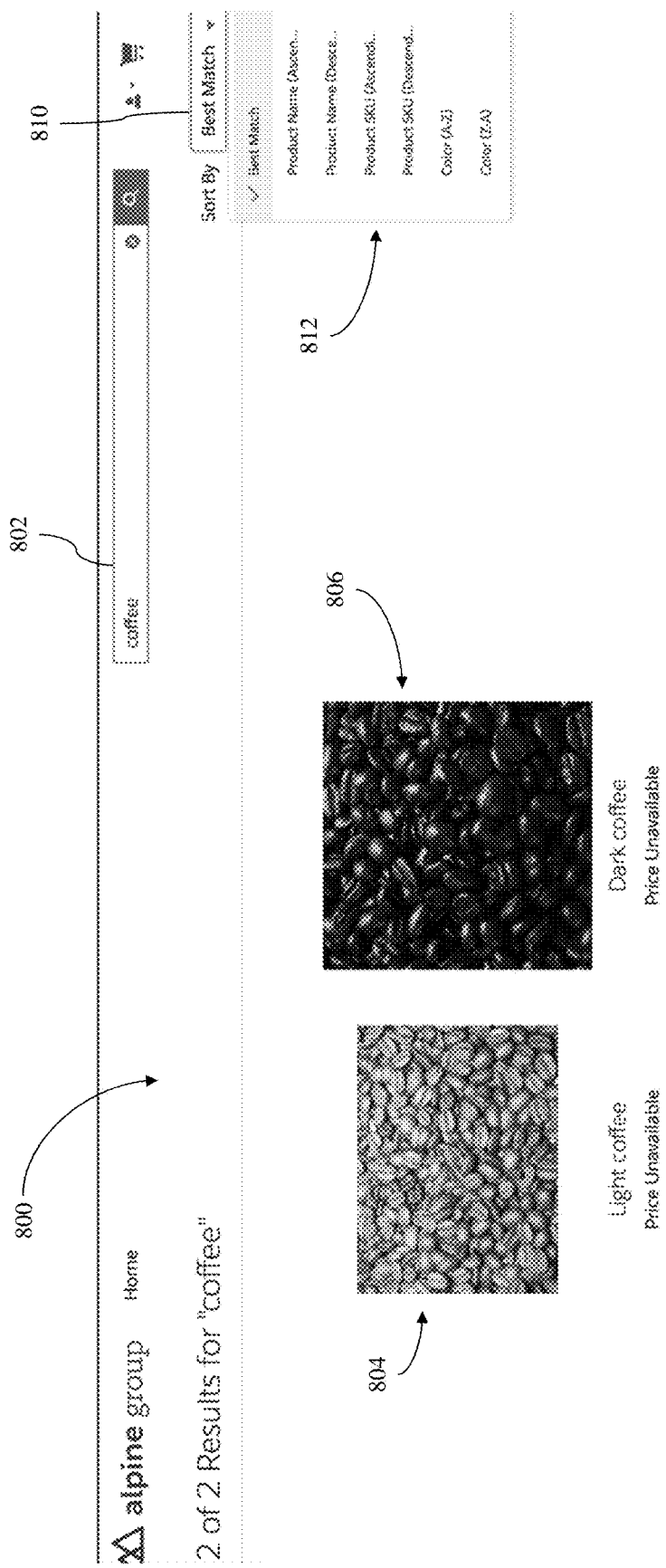
FIGS. 8-10 depict an exemplary sequence of graphical user interface (GUI) displays suitable for presentation on a client device in connection with the custom sorting process of FIG. 7 according to an example implementation.
Figure 9:
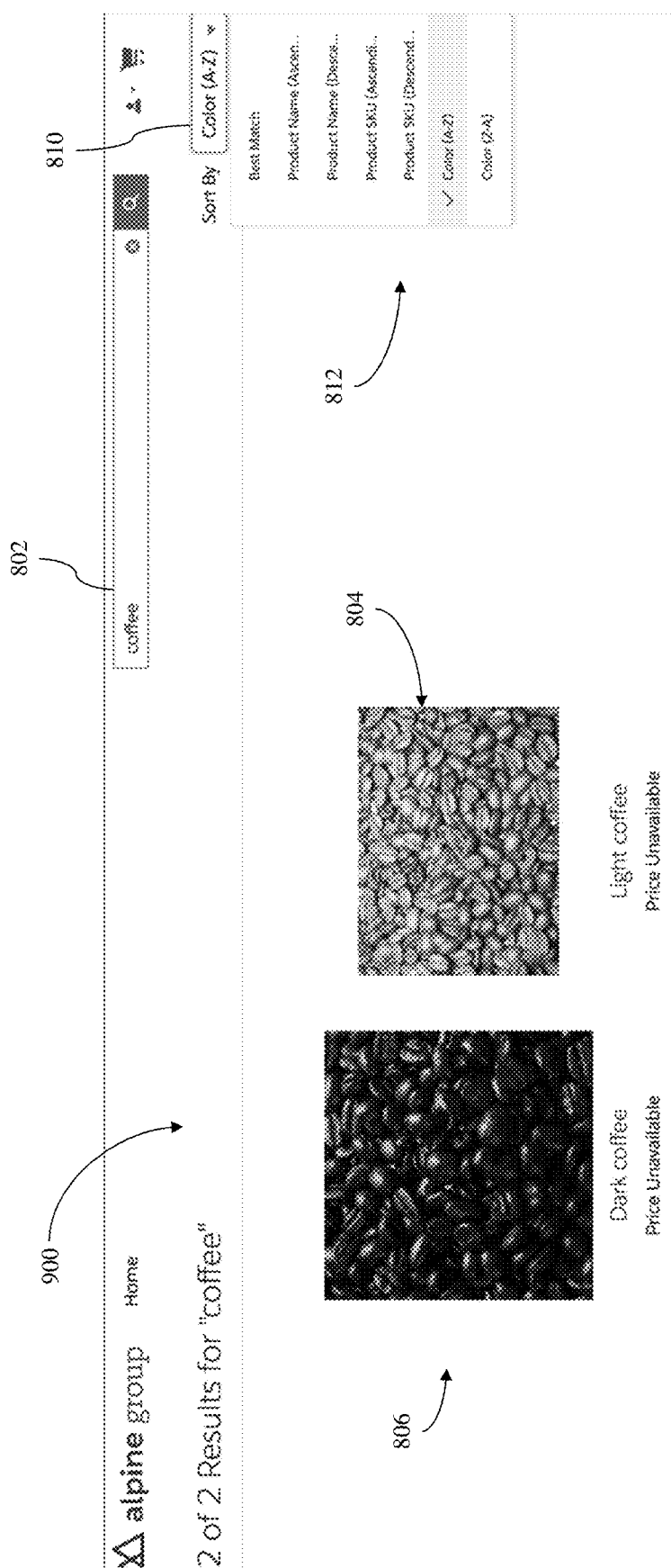
Figure 10:
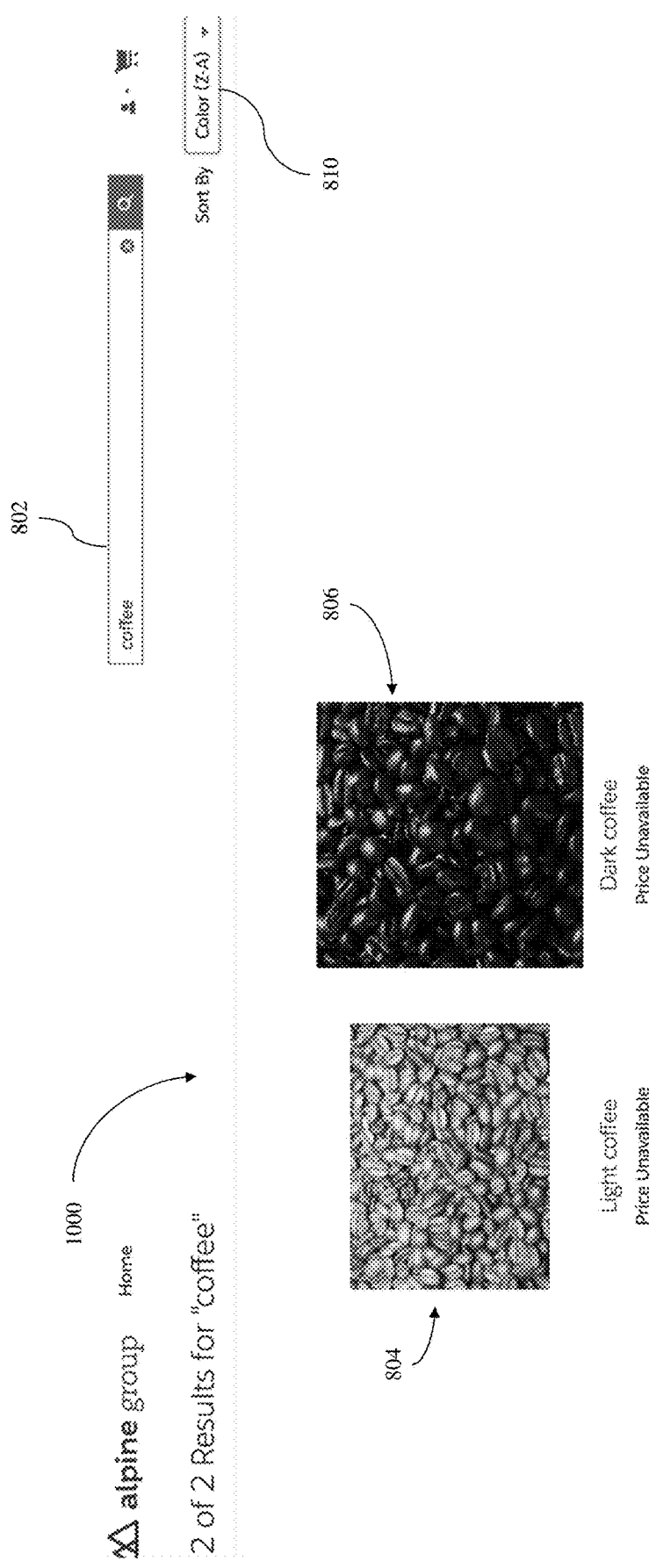

FIGS. 8-10 depict an exemplary sequence of web page GUI displays that may be generated or otherwise presented by an instance of an e-commerce virtual application 140 within a client application 109 at a client device 108 in connection with an exemplary implementation of the custom sorting process 700 of FIG. 7. FIG. 8 depicts an exemplary search results GUI display 800 that depicts a subset of the resource owner's product data records 114 that match the input search key of "coffee" received via the input search key text box 802. In this regard, FIG. 8 depicts a scenario where a predefined standard best match sorting rule is initially identified as selected by virtue of the best match sorting rule having an associated sorting menu order field value of 1, resulting in the search service 150 providing an ordered listing of the matching subset of coffee product data records 114 that are ranked or ordered in accordance with similarity to the input search key based on a matching algorithm associated with the search service 150. For example, the matching algorithm may utilize artificial intelligence (AI), natural language processing (NLP) or other techniques to generate an ordered listing of search results that contain the closest matches to the input search key ordered in accordance with their similarity to the input search key. The e-commerce virtual application 140 utilizes the indicia of the product data records 114 to generate corresponding graphical representations 804, 806 of the product data records 114 ranked in the defined order, for example, by retrieving product images or other product data from the matching data records 114 in the database 106.

In response to user selection of the sorting rule drop-down menu 810, the e-commerce virtual application 140 generates a listing or menu 812 associated with the drop-down menu 810 that includes graphical indicia of the sorting rules supported for the resource owner including graphical representations of the labels associated with the respective sorting rules arranged in the order according to the sorting rule menu order field values associated with the respective sorting rules. In this regard, FIG. 8 depicts a scenario where a user-configured custom sorting rule to sort by a color custom data field in an ascending order is assigned a sorting rule menu order value of 5 and another user-configured custom sorting rule to sort by the color custom data field in a descending order is assigned a sorting rule menu order value of 6. To populate the sorting rule drop-down menu 812, the e-commerce virtual application 140 may retrieve the user-configured value for the sorting rule menu order for the respective sorting rules from the sorting rule table 116 to determine the desired custom order for the supported sorting rules, and then, for each sorting rule in the drop-down menu 812, display or otherwise present the user-configured sorting rule label assigned to the respective sorting rule at the desired rank, priority, order or position within the drop-down menu 812.

Referring to FIG. 9 with reference to FIG. 8, in response to user selection of the custom sorting rule to sort records by the color custom data field in the ascending or alphabetical order (e.g., "Color (A-Z)"), the custom sorting service of the e-commerce virtual application 140 provides indicia of the color data field and the ascending or alphabetical order to the search service 150 along with the coffee input search key, which, in turn, utilizes the search index 118 associated with the resource owner to obtain an ordered listing of coffee product data records 114 with the dark coffee product data record preceding or being prioritized ahead of the light coffee product data record by virtue of the value of the color custom data field being alphabetically ahead of the value of the color custom data field of the light coffee product data record (e.g., "dark" vs "light"). The e-commerce virtual application 140 generates the updated search result GUI display 900 that includes the graphical representation of the dark coffee product data record 806 being ranked, prioritized, ordered or otherwise sorted ahead of the graphical representation of the light coffee product data record 804, for example, by presenting the graphical representation of the dark coffee product data record 806 above and/or to the left of the graphical representation of the light coffee product data record 804.

Referring to FIG. 10, in response to user selection of the custom sorting rule to sort records by the color custom data field in the descending or reverse alphabetical order (e.g., "Color (Z-A)"), the custom sorting service of the e-commerce virtual application 140 provides indicia of the color data field and the descending or reverse alphabetical order to the search service 150 along with the coffee input search key, which, in turn, utilizes the search index 118 associated with the resource owner to obtain an ordered listing of coffee product data records 114 with the light coffee product data record preceding or being prioritized ahead of the dark coffee product data record. The e-commerce virtual application 140 dynamically updates and generates the updated search result GUI display 1000 that includes the graphical representation of the light coffee product data record 804 being ranked, prioritized, ordered or otherwise sorted ahead of the graphical representation of the dark coffee product data record 806 in response to user selection of a different custom sorting rule. Thus, by virtue of the custom sorting configuration process 200 and the custom sorting process 700, a resource owner may configure or otherwise define different custom sorting rules that allow customers or other end users to sort data records by different data fields (including both standard fields or custom data fields) of different data records (including both standard database object types and custom database object types) in different sort orders, thereby providing a flexible, customizable and improved user experience when searching for data records.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 11A:
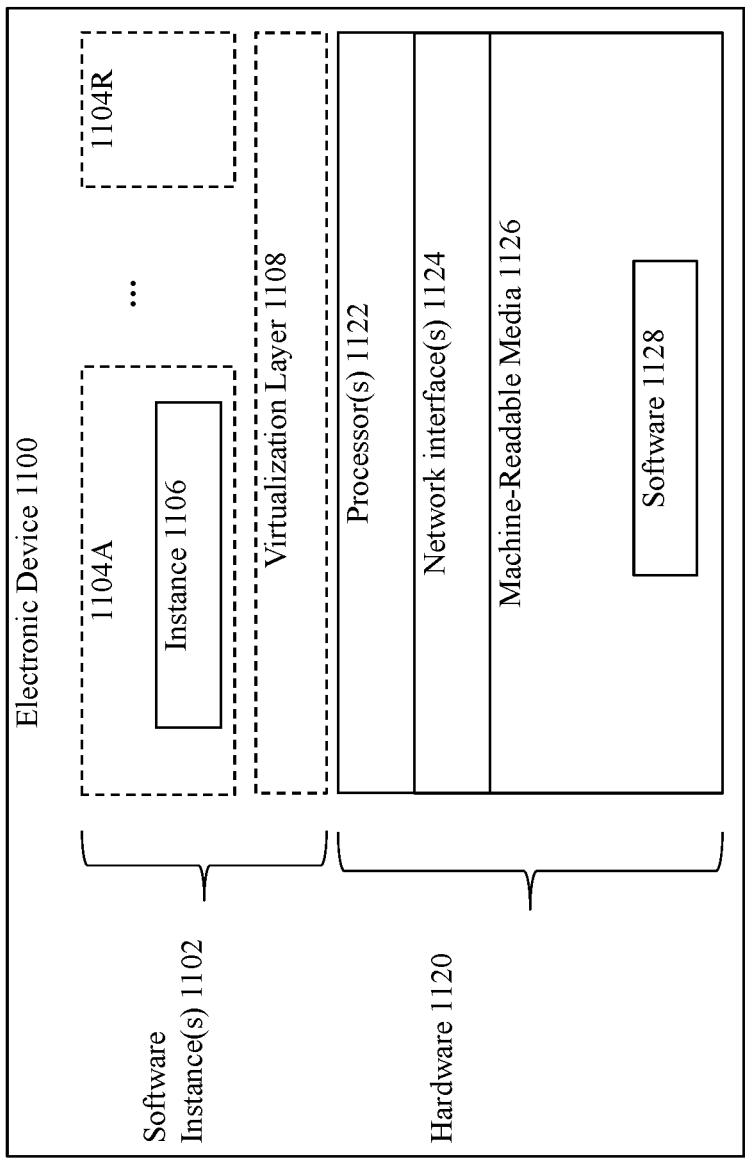
FIG. 11A is a block diagram illustrating an electronic device according to some example implementations.

FIG. 11A is a block diagram illustrating an electronic device 1100 according to some example implementations. FIG. 11A includes hardware 1120 comprising a set of one or more processor(s) 1122, a set of one or more network interfaces 1124 (wireless and/or wired), and machine-readable media 1126 having stored therein software 1128 (which includes instructions executable by the set of one or more processor(s) 1122). The machine-readable media 1126 may include non-transitory and/or transitory machine-readable media. Each of the previously described clients and a custom sorting service may be implemented in one or more electronic devices 1100. In one implementation: 1) each of the clients is implemented in a separate one of the electronic devices 1100 (e.g., in end user devices where the software 1128 represents the software to implement clients to interface directly and/or indirectly with the custom sorting service (e.g., software 1128 represents a web browser, a native client, a portal, a command-line interface, and/or an application programming interface (API) based upon protocols such as Simple Object Access Protocol (SOAP), Representational State Transfer (REST), etc.)); 2) the custom sorting service is implemented in a separate set of one or more of the electronic devices 1100 (e.g., a set of one or more server devices where the software 1128 represents the software to implement the custom sorting service); and 3) in operation, the electronic devices implementing the clients and the custom sorting service would be communicatively coupled (e.g., by a network) and would establish between them (or through one or more other layers and/or or other services) connections for submitting requests to the custom sorting service. Other configurations of electronic devices may be used in other implementations (e.g., an implementation in which the client and the custom sorting service are implemented on a single one of electronic device 1100).

During operation, an instance of the software 1128 (illustrated as instance 1106 and referred to as a software instance; and in the more specific case of an application, as an application instance) is executed. In electronic devices that use compute virtualization, the set of one or more processor(s) 1122 typically execute software to instantiate a virtualization layer 1108 and one or more software container(s) 1104A-1104R (e.g., with operating system-level virtualization, the virtualization layer 1108 may represent a container engine (such as Docker Engine by Docker, Inc. or rkt in Container Linux by Red Hat, Inc.) running on top of (or integrated into) an operating system, and it allows for the creation of multiple software containers 1104A-1104R (representing separate user space instances and also called virtualization engines, virtual private servers, or jails) that may each be used to execute a set of one or more applications; with full virtualization, the virtualization layer 1108 represents a hypervisor (sometimes referred to as a virtual machine monitor (VMM)) or a hypervisor executing on top of a host operating system, and the software containers 1104A-1104R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1128 is executed within the software container 1104A on the virtualization layer 1108. In electronic devices where compute virtualization is not used, the instance 1106 on top of a host operating system is executed on the "bare metal" electronic device 1100. The instantiation of the instance 1106, as well as the virtualization layer 1108 and software containers 1104A-1104R if implemented, are collectively referred to as software instance(s) 1102.

Alternative implementations of an electronic device may have numerous variations from that described above. For example, customized hardware and/or accelerators might also be used in an electronic device.

Figure 11B:
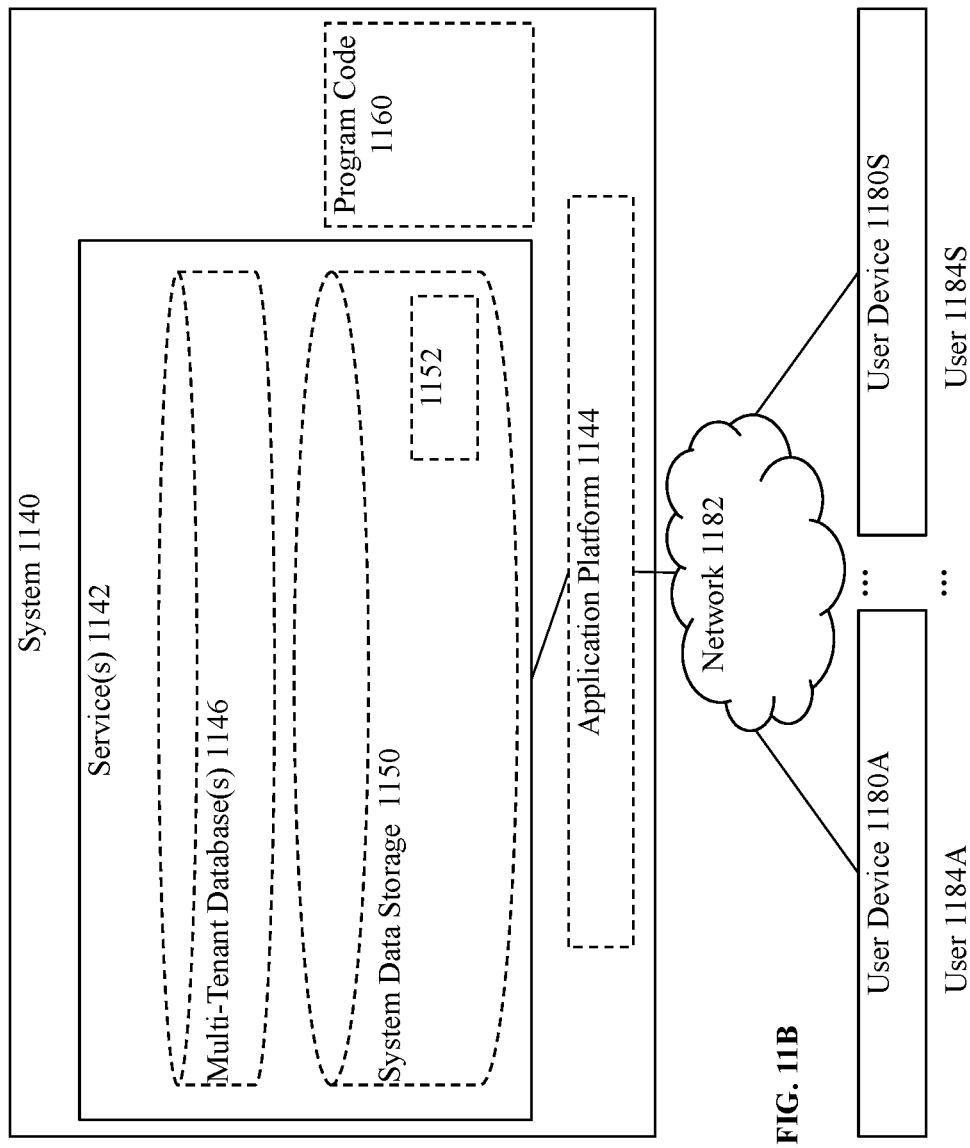
FIG. 11B is a block diagram of a deployment environment according to some example implementations.

FIG. 11B is a block diagram of a deployment environment according to some example implementations. A system 1140 includes hardware (e.g., a set of one or more server devices) and software to provide service(s) 1142, including a custom sorting service. In some implementations the system 1140 is in one or more datacenter(s). These datacenter(s) may be: 1) first party datacenter(s), which are datacenter(s) owned and/or operated by the same entity that provides and/or operates some or all of the software that provides the service(s) 1142; and/or 2) third-party datacenter(s), which are datacenter(s) owned and/or operated by one or more different entities than the entity that provides the service(s) 1142 (e.g., the different entities may host some or all of the software provided and/or operated by the entity that provides the service(s) 1142). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1140 is coupled to user devices 1180A-1180S over a network 1182. The service(s) 1142 may be on-demand services that are made available to one or more of the users 1184A-1184S working for one or more entities other than the entity which owns and/or operates the on-demand services (those users sometimes referred to as outside users) so that those entities need not be concerned with building and/or maintaining a system, but instead may make use of the service(s) 1142 when needed (e.g., when needed by the users 1184A-1184S). The service(s) 1142 may communicate with each other and/or with one or more of the user devices 1180A-1180S via one or more APIs (e.g., a REST API). In some implementations, the user devices 1180A-1180S are operated by users 1184A-1184S, and each may be operated as a client device and/or a server device. In some implementations, one or more of the user devices 1180A-1180S are separate ones of the electronic device 1100 or include one or more features of the electronic device 1100.

In some implementations, the system 1140 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 1140 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 1140 may include an application platform 1144 that enables PAAS for creating, managing, and executing one or more applications developed by the provider of the application platform 1144, users accessing the system 1140 via one or more of user devices 1180A-1180S, or third-party application developers accessing the system 1140 via one or more of user devices 1180A-1180S.

In some implementations, one or more of the service(s) 1142 may use one or more multi-tenant databases 1146, as well as system data storage 1150 for system data 1152 accessible to system 1140. In certain implementations, the system 1140 includes a set of one or more servers that are running on server electronic devices and that are configured to handle requests for any authorized user associated with any tenant (there is no server affinity for a user and/or tenant to a specific server). The user devices 1180A-1180S communicate with the server(s) of system 1140 to request and update tenant-level data and system-level data hosted by system 1140, and in response the system 1140 (e.g., one or more servers in system 1140) automatically may generate one or more Structured Query Language (SQL) statements (e.g., one or more SQL queries) that are designed to access the desired information from the multi-tenant database(s) 1146 and/or system data storage 1150.

In some implementations, the service(s) 1142 are implemented using virtual applications dynamically created at run time responsive to queries from the user devices 1180A-1180S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1160 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1144 includes an application setup mechanism that supports application developers' creation and management of applications, which may be saved as metadata by save routines. Invocations to such applications, including the custom sorting service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1182 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1140 and the user devices 1180A-1180S.

Each user device 1180A-1180S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1140. For example, the user interface device can be used to access data and applications hosted by system 1140, and to perform searches on stored data, and otherwise allow one or more of users 1184A-1184S to interact with various GUI pages that may be presented to the one or more of users 1184A-1184S. User devices 1180A-1180S might communicate with system 1140 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1180A-1180S might include an HTTP client, commonly referred to as a "browser," for sending and receiving HTTP messages to and from server(s) of system 1140, thus allowing users 1184A-1184S of the user devices 1180A-1180S to access, process and view information, pages and applications available to it from system 1140 over network 1182.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of ordering records at a database system comprising an application platform providing instances of a virtual application to a plurality of resource owners, the method comprising:
 providing, within an instance of the virtual application presented at a client device coupled to the database system over a network, a graphical user interface (GUI) element manipulable to select one of a plurality of different sorting rules configured at the database system for a particular resource owner of the plurality of resource owners associated with the instance of the virtual application, wherein the GUI element is populated with the plurality of different sorting rules based at least in part on a sorting rule table at the database system, the sorting rule table including a respective entry maintaining user-configured sorting rule criteria for each custom sorting rule of the plurality of different sorting rules;
 receiving, via the GUI element, user selection of a first custom sorting rule of the plurality of different sorting rules, the first custom sorting rule comprising the user-configured sorting rule criteria for a custom data field associated with a custom database object type, wherein the custom data field of the custom database object type is specific to the particular resource owner of the plurality of resource owners at the database system;
 rebuilding, at the database system, a search index associated with the particular resource owner of the plurality of resource owners in accordance with the user-configured sorting rule criteria for each custom sorting rule of the plurality of different sorting rules, resulting in a rebuilt search index associated with the particular resource owner at the database system; and
 in response to the user selection of the first custom sorting rule within the instance of the virtual application at the client device:
  obtaining an ordered listing of the records of the custom database object type at the database system, wherein the ordered listing of the records is ordered by the custom data field of the records associated with the first custom sorting rule in accordance with a user-configured sort order associated with the first custom sorting rule using the rebuilt search index associated with the particular resource owner at the database system; and
  providing, within the instance of the virtual application, graphical indication of at least a subset of the ordered listing of the records of the custom database object type ordered by the custom data field in accordance with the user-configured sort order.

2. The method of claim 1, wherein providing the GUI element comprises providing a drop-down menu including a listing of the plurality of different sorting rules ordered within the listing in accordance with a respective value for a sorting menu order field associated with the respective entry for the respective sorting rule of the plurality of different sorting rules.

3. The method of claim 2, further comprising obtaining, from the respective entry in the sorting rule table for the first custom sorting rule of the plurality of different sorting rules, a user-configured value for the sorting menu order field associated with the first custom sorting rule, wherein a graphical indication of the first custom sorting rule is ordered in the listing within the drop-down menu in accordance with the user-configured value.

4. The method of claim 3, further comprising obtaining, from the respective entry in the sorting rule table for the first custom sorting rule of the plurality of different sorting rules, a user-configured sorting rule label associated with the first custom sorting rule, wherein the graphical indication comprises the user-configured sorting rule label.

5. The method of claim 1, further comprising providing a sorting rule definition GUI display including a first GUI element to receive first user input indicative of the custom data field.

6. The method of claim 5, further comprising identifying sortable data fields associated with the records, wherein the first GUI element comprises a drop-down menu for selecting one of the sortable data fields.

7. The method of claim 1, further comprising:
 receiving, via a second GUI element within the instance of the virtual application presented at the client device, an input search key; and
 providing the input search key and indicia of the custom data field and the user-configured sort order to a search service, wherein:
  the search service utilizes the search index to identify a matching subset of the records at the database system for the input search key and orders records of the matching subset by respective values of the custom data field in the user-configured sort order, resulting in an ordered subset of matching records; and
  the ordered listing of the records comprises the ordered subset of matching records.

8. At least one non-transitory machine-readable storage medium that provides instructions that, when executed by at least one processor, are configurable to cause the at least one processor to perform operations comprising:
 providing, within an instance of a virtual application presented at a client device coupled to a network, a graphical user interface (GUI) element manipulable to select one of a plurality of different sorting rules configured at a database system for a particular resource owner associated with the instance of the virtual application of a plurality of resource owners at the database system, the database system comprising an application platform providing instances of the virtual application to the plurality of resource owners, wherein the GUI element is populated with the plurality of different sorting rules based at least in part on a sorting rule table at the database system, the sorting rule table including a respective entry maintaining user-configured sorting rule criteria for each custom sorting rule of the plurality of different sorting rules;
 receiving, via the GUI element, user selection of a first custom sorting rule of the plurality of different sorting rules, the first custom sorting rule comprising the user-configured sorting rule criteria for a custom data field associated with a custom database object type, wherein the custom data field of the custom database object type is specific to the particular resource owner of the plurality of resource owners at the database system;
 rebuilding, at the database system, a search index associated with the particular resource owner of the plurality of resource owners in accordance with the user-configured sorting rule criteria for each custom sorting rule of the plurality of different sorting rules, resulting in a rebuilt search index associated with the particular resource owner at the database system; and in response to the user selection of the first custom sorting rule within the instance of the virtual application at the client device:

obtaining an ordered listing of the records of the custom database object type at the database system, wherein the ordered listing of the records is ordered by the custom data field of the records associated with the first custom sorting rule in accordance with a user-configured sort order associated with the first custom sorting rule using the rebuilt search index associated with the particular resource owner at the database system; and providing, within the instance of the virtual application, graphical indication of at least a subset of the ordered listing of the records of the custom database object type ordered by the custom data field in accordance with the user-configured sort order.

9. The at least one non-transitory machine-readable storage medium of claim 8, wherein the instructions are configurable to cause the at least one processor to provide a drop-down menu including a listing of the plurality of different sorting rules ordered within the listing in accordance with a respective value for a sorting menu order field associated with the respective entry for the respective sorting rule of the plurality of different sorting rules.

10. The at least one non-transitory machine-readable storage medium of claim 9, wherein the instructions are configurable to cause the at least one processor to obtain, from the respective entry in the sorting rule table for the first custom sorting rule of the plurality of different sorting rules, a user-configured value for the sorting menu order field associated with the first custom sorting rule, wherein a graphical indication of the first custom sorting rule is ordered in the listing within the drop-down menu in accordance with the user-configured value.

11. The at least one non-transitory machine-readable storage medium of claim 10, wherein the instructions are configurable to cause the at least one processor to obtain, from the respective entry in the sorting rule table for the first custom sorting rule of the plurality of different sorting rules, a user-configured sorting rule label associated with the first custom sorting rule, wherein the graphical indication comprises the user-configured sorting rule label.

12. The at least one non-transitory machine-readable storage medium of claim 8, wherein the instructions are configurable to cause the at least one processor to provide a sorting rule definition GUI display including a first GUI element to receive first user input indicative of the custom data field.

13. The at least one non-transitory machine-readable storage medium of claim 12, wherein the instructions are configurable to cause the at least one processor to identify sortable data fields associated with the records, wherein the first GUI element comprises a drop-down menu for selecting one of the sortable data fields.

14. The at least one non-transitory machine-readable storage medium of claim 8, wherein the instructions are configurable to cause the at least one processor to:

receive, via a second GUI element within the instance of the virtual application presented at the client device, an input search key; and provide the input search key and indicia of the custom data field and the user-configured sort order to a search service, wherein:

the search service utilizes the search index to identify a matching subset of the records at the database system for the input search key and orders records of the matching subset by respective values of the custom data field in the user-configured sort order, resulting in an ordered subset of matching records; and the ordered listing of the records comprises the ordered subset of matching records.

15. A computing device comprising:

at least one non-transitory machine-readable storage medium that stores software; and at least one processor, coupled to the at least one non-transitory machine-readable storage medium, to execute the software that implements a custom sorting service and that is configurable to:

provide, within an instance of a virtual application presented at a client device coupled to a network, a graphical user interface (GUI) element manipulable to select one of a plurality of different sorting rules configured at a database system for a particular resource owner associated with the instance of the virtual application of a plurality of resource owners at the database system, the database system comprising an application platform providing instances of the virtual application to the plurality of resource owners, wherein the GUI element is populated with the plurality of different sorting rules based at least in part on a sorting rule table at the database system, the sorting rule table including a respective entry maintaining user-configured sorting rule criteria for each custom sorting rule of the plurality of different sorting rules;

receive, via the GUI element, user selection of a first custom sorting rule of the plurality of different sorting rules, the first custom sorting rule comprising the user-configured sorting rule criteria for a custom data field associated with a custom database object type, wherein the custom data field of the custom database object type is specific to the particular resource owner of the plurality of resource owners at the database system;

rebuild, at the database system, a search index associated with the particular resource owner of the plurality of resource owners in accordance with the user-configured sorting rule criteria for each custom sorting rule of the plurality of different sorting rules, resulting in a rebuilt search index associated with the particular resource owner at the database system; and in response to the user selection of the first custom sorting rule within the instance of the virtual application at the client device:

obtain an ordered listing of the records of the custom database object type at the database system, wherein the ordered listing of the records is ordered by the custom data field of the records associated with the first custom sorting rule in accordance with a user-configured sort order associated with the first custom sorting rule using the rebuilt search index associated with the particular resource owner at the database system; and provide, within the instance of the virtual application, graphical indication of at least a subset of the ordered listing of the records of the custom database object type ordered by the custom data field in accordance with the user-configured sort order.

* * * * *